(12) United States Patent
Tsunematsu (10) Patent No.: US 8,395,819 B2
(45) Date of Patent: Mar. 12, 2013

(54) IMAGE PROCESSING DEVICE, IMAGE PROCESSING METHOD AND COMPUTER READABLE MEDIUM

(75) Inventor: Yuuichi Tsunematsu, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 908 days.

(21) Appl. No.: 12/484,825

(22) Filed: Jun. 15, 2009

(65) Prior Publication Data

US 2009/0316217 A1    Dec. 24, 2009

(30) Foreign Application Priority Data

Jun. 18, 2008    (JP) ................................. 2008-159282

(51) Int. Cl.
*H04N 1/40* (2006.01)

(52) U.S. Cl. ...... 358/3.21; 358/1.1; 358/1.11; 358/1.16; 358/1.18; 358/3.24; 382/173; 382/180; 382/195

(58) Field of Classification Search .................... 358/1.1, 358/1.9, 1.18, 3.21, 3.24
See application file for complete search history.

(56) References Cited

U.S. PATENT DOCUMENTS

| | | | | |
|---|---|---|---|---|
| 5,941,944 A | * | 8/1999 | Messerly | 709/203 |
| 5,963,968 A | * | 10/1999 | Warmus et al. | 715/246 |
| 6,285,458 B1 | | 9/2001 | Yada | 358/1.151 |
| 7,593,120 B2 | * | 9/2009 | Kitora et al. | 358/1.13 |
| 2004/0061883 A1 | | 4/2004 | Kanatsu | 358/1.9 |
| 2006/0010115 A1 | * | 1/2006 | Yoshida et al. | 707/3 |
| 2006/0059418 A1 | * | 3/2006 | Elkady | 715/508 |
| 2007/0127043 A1 | | 6/2007 | Maekawa | 358/1.9 |

FOREIGN PATENT DOCUMENTS

| | | |
|---|---|---|
| JP | 10-51642 A | 2/1998 |
| JP | 10-215379 A | 8/1998 |
| JP | 2000-306103 A | 11/2000 |
| JP | 2006-023940 | 1/2006 |
| JP | 3950777 B | 4/2007 |
| JP | 2007-158510 A | 6/2007 |

* cited by examiner

*Primary Examiner* — Richard Zhu
(74) *Attorney, Agent, or Firm* — Fitzpatrick, Cella, Harper & Scinto (57) ABSTRACT

An image processing device including a registration unit that registers plurality pieces of style information is provided. In the device, one object or a plurality of objects is extracted from image data. By comparing the extracted objects with objects included in the plurality pieces of style information that are registered on the registration unit, style information to be output is selected. An object which is not included in the selected style information is selected among the extracted objects as an output object. An electronic file in which the selected output object is recorded on a page description part, and the selected style information is recorded on a style description part, is output.

12 Claims, 9 Drawing Sheets

OBJECT MANAGING TABLE

|  | NUMBER OF COINCIDING OBJECTS | COINCIDING OBJECTS |
|---|---|---|
| STYLE INFORMATION 1 | 5 | 2, 3, 4, 5, 6 |
| STYLE INFORMATION 2 | 3 | 2, 3, 6 |
| STYLE INFORMATION 3 | 0 | - |
| STYLE INFORMATION 4 | 1 | 4 |

IMAGE PROCESSING DEVICE, IMAGE PROCESSING METHOD AND COMPUTER READABLE MEDIUM

BACKGROUND OF THE INVENTION

1. Field of the Invention

The present invention relates to an image processing device, an image processing method thereof, and a computer readable medium which stores a program for the method. More specifically, it relates to image processing for generating an electronic file that stores a document image thereon in a reusable manner by compressing and encoding an image.

2. Description of the Related Art

In recent years, processing for reading a paper document and storing it on a computer as a compressed encoded electronic file, and processing for editing scanned data on a computer to reuse it are commonly carried out.

Since data a size of an image (especially, a color image) is large, it is necessary to store the image by reducing the data size thereof using a compression technology. However, if the image is subjected to compression at an extremely high compression ratio, an image quality will deteriorate remarkably, occurring a problem in that a character portion which is important for many documents can not be read.

As technologies for solving this problem, technologies in which a method for compression is changed depending on characteristics of an image (Japanese Patent Laid-Open Nos. H10-51642(1998) and H10-215379(1998)), a technology in which a layer structure of an image is extracted, and each layer is subjected to effective compression processing (Japanese Patent Laid-open No. 2000-306103), and a technology in which, when a plurality of images is inputted, common background images are output collectively (Japanese Patent Laid-Open No. 2007-158510), are known.

According to the above-mentioned prior art technologies it is possible to reduce data size of one or a plurality sheets of image data while keeping their image quality to some extent. However, since data included in an electronic file generated by the prior art technologies is generated from an input image, there are problems in that noises may be added to the data by scanning, thereby, the image quality of the data is degraded, or the size of the data is enlarged.

On the other hand, in order to improve appearance, many presentation documents for use of a meeting at a company are generated by being applied with style information (template) registered into presentation document generation software (e.g. Microsoft Office PowerPoint 2007) in advance. The style information generally holds information, such as positional information on a background image and a drawing object, information on a size and a color, coordinate information on header/footer areas, and information on a style of a standard figure. There are advantages in that the background image of registered style information has a good image quality, and the data size of the background image is also significantly smaller than that generated from an input image.

The applicant of the present invention devised it by attaching attention to the fact that many presentation documents are generated by being applied with style information prepared into software in advance. An object of the present invention is to achieve a high image quality and a high compression ratio using style information registered in advance for the output to a preservation format when a processing target image uses the registered style information.

SUMMARY OF THE INVENTION

The present invention provides an image processing device which comprises a registration component configured to register a plurality pieces of style information, an extraction component configured to extract one or a plurality of objects from image data, a style-information selection component configured to select style information to be output by comparing the extracted objects with objects included in the plurality pieces of style information registered on the registration component, an object selection component configured to select an object which is not included in the selected style information among the extracted objects as an output object, and an output component configured to output an electronic file in which the selected output object is recorded on a page description part and the selected style information is recorded on a style description part.

According to the present invention, a size of an output file reduces by using the registered style information for an output to a preservation format, so scanning noises will not be included in a background image, enabling to improve an image quality thereof. Moreover, in presentation generation software, style information is generally configured so that it cannot be edited directly by ordinary editing, and it can be edited when a user explicitly directs "editing of style information". The reason of this is to reduce miss-operations of a user with respect to the style information. Use of registered style information for the output to the preservation format reduces operations of a user with respect to an object relevant to the style information, which is not necessary to be edited essentially, and also improves editing properties of an output data. Moreover, it is also possible to change the style information easily using software.

Further, according to the present invention, when a plurality of images is inputted, by outputting an object common to each page into the style description part, it is possible to cause the object not to be edited easily. Thus, it is possible for an object which is relevant to style information in many cases and common to each page, to be prevented from being subjected to a miss-operation, for which editing is not necessary essentially, thereby improving editing properties of an output data.

Furthermore, according to the present invention, by referring to header/footer information included in style information, it is possible to cause an object to be edited easily. Thus, it is possible for an object which is relevant to the style information in many cases and included in the header/footer areas, to be prevented from being subjected to a miss-operation, for which editing is not necessary essentially, thereby improving editing properties of an output data.

Further features of the present invention will become apparent from the following description of exemplary embodiments (with reference to the attached drawings).

DESCRIPTION OF THE EMBODIMENTS

First Embodiment

Figure 1:
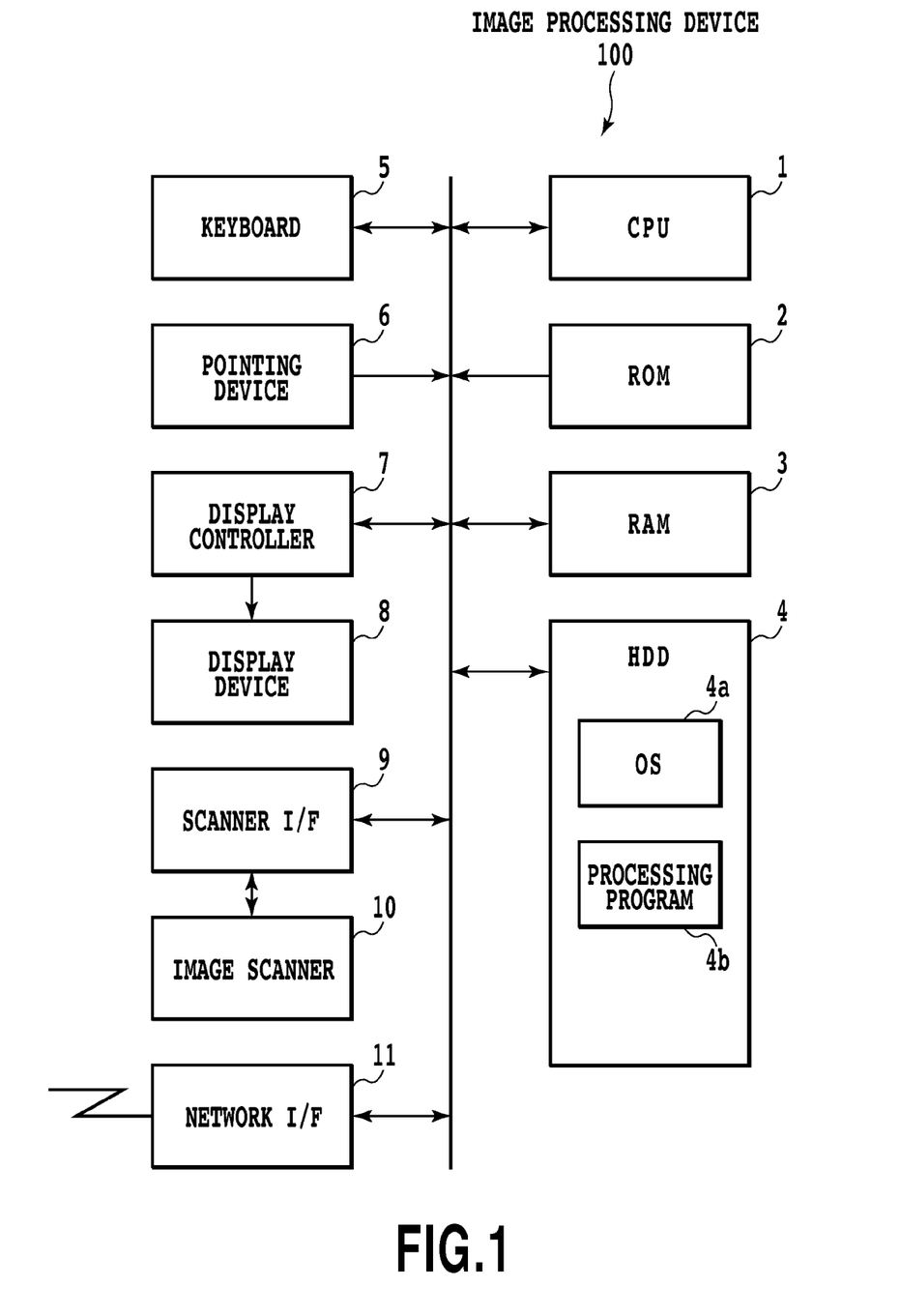
FIG. 1 is a block diagram showing a configuration of an information processor (image processing device) according to embodiments of the present invention.

FIG. 1 is a block diagram of a configuration of an information processor (image processing device) 100 according to a first embodiment of the present invention. The information processor 100 according to the present embodiment includes a hardware configuration possessed by a universal information processor such as a personal computer (PC).

In the figure, CPU 1 manages entire control of the device. ROM 2 stores BIOS and a boot program. RAM 3 is used for a working area of CPU 1. OS (operating system), various processing programs, and data are read into RAM 3, and processed by CPU 1. Into a hard disk device (hereinafter, referred to as HDD) 4 as an external storage device, as illustrated in the figure, OS 4*a* and a processing program 4*b* according to the present embodiment are installed. In addition, on HDD 4, data files (image data files are also included) generated with various applications and image data files input from an input device, such as a scanner that will be described later, are also stored. A keyboard 5 is an input device. A pointing device 6 is constructed by a mouse etc. A display controller 7 performs imaging processing to a video memory and reads image data at a predetermined timing from the video memory, and output it as a video signal to a display device 8. The display device 8 may be a CRT, a liquid crystal display, or the like. A scanner interface (I/F) 9 is an interface for connecting an image scanner 10 that reads a manuscript. As the scanner I/F 9, for example, an SCSI interface, a USB interface, or the like can be used. Moreover, the image scanner 10 mounts an ADF (Automatic Document Feeder) thereon and has a function of transferring an original manuscript to a reading position and reading it. As a network interface (I/F) 11, for example, Ethernet (registered trademark), or the like can be used.

In the above-mentioned configuration, when the power supply of the information processor 100 is set to ON, CPU 1 will load OS on RAM 3 from HDD 4 according to the boot program stored in ROM 2, and it will act as an information processor. After that, CPU 1 starts the processing program 4*b* automatically or starts the processing program 4*b* (loaded on RAM 3 and executed) by an operation of a user. The processing program 4*b* is a computer program that causes a computer (CPU) to execute the below described processing steps so that the computer acts as equipment for executing compression processing with respect to the image data of the present embodiment.

If the processing program 4*b* is executed, a manuscript set on the image scanner 10 is read according to the direction from a user, and the read image data is stored on RAM 3. Then, an electronic file is generated by carrying out the below described processing with respect to an image data, and the file is stored on HDD 4.

Figure 2:
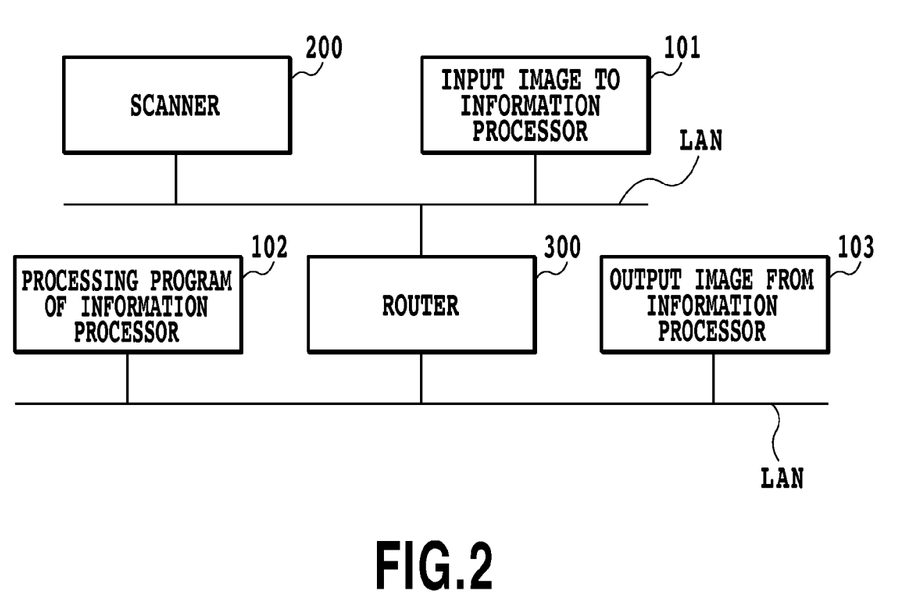
FIG. 2 is a view illustrating an exemplary network system to which the embodiments of the present invention is applicable.

In addition, although an example in which the configuration of a device according to the present embodiment is a standalone configuration, is described above, the device can also have a configuration in which an image scanner and a device (such as a data base server or a file sever) that is a storage destination of a compressed data file to be generated finally are provided on a network. FIG. 2 illustrates such an exemplary configuration.

In FIG. 2, an information processor 101 causes the scanner 200 on a network to read a manuscript image, and receives the read image data. The information processor 101 sequentially transmits the read image data to an information processor 102 through a router 300 in order. The information processor 102 executes the above-mentioned compression processing with respect to the received image data, and transmits the resultant data file to an information processor 103. The information processor 103 acts as a database server or a file server, and stores the transmitted data file. In the configuration of FIG. 2, the information processor 102 executes the same processing as that of FIG. 1. Moreover, since, as easily understood from the configuration of FIG. 2, the processing can also be executed under a circumstance in which a plurality of LANs is connected, it may also be executed in a configuration through Internet.

Hereinafter, for the sake of simplicity, the present embodiment will be described based on the configuration of FIG. 1, however, as described in FIG. 2, it is clear that the present invention can be embodied through a network.

Hereinafter, the contents of processing of the processing program 4*a* executed by the information processor 100 according to the present embodiment will be described according to the flow chart of FIG. 3. The processing is executed when the program 4*a* (application) is started, and reading of a manuscript is directed by a pointing device 6 on the GUI screen (not illustrated) of the processor 100.

First, at Step S310, image input processing for acquiring image data by reading a manuscript through the scanner 10, is executed. At Step S320, the acquired image data is subjected to area division processing. Although there are several methods for executing area division processing, for example, if a method of Japanese Patent Number No. 3950777 is applied for the processing, the image data can be divided into one or more partial areas each having different properties of characters, figures, pictures, tables, and the like under a condition in which reversed characters are also considered. Hereinafter, one partial area having such different properties will be referred to as an object. By the area division processing at Step S320, one object or a plurality of objects can be obtained.

After executing area division and extracting one or a plurality of objects, at Step 330, based on the extracted objects, whether pieces of style information that can be deemed to coincide with each other are present among registered pieces of style information, is retrieved. In the objects extracted at Step S320, added contents (characters of documents, description views, or the like) that are not included in the pieces of style information are also included. In consideration of these points, the style information is retrieved by the following procedures.

The flow of style-information retrieval at Step S330 will be described using the flow chart in FIG. 4, and FIG. 5. At the left side in FIG. 5, six objects obtained from the area division of an input image are illustrated, and, at the right side, four kinds pieces of style information registered in advance on the storage device (HDD 4) included by the image processing device 100 are illustrated. To each object extracted by area division, reference numerals 1 to 6 are assigned as ID for identifying the object.

Figure 4:
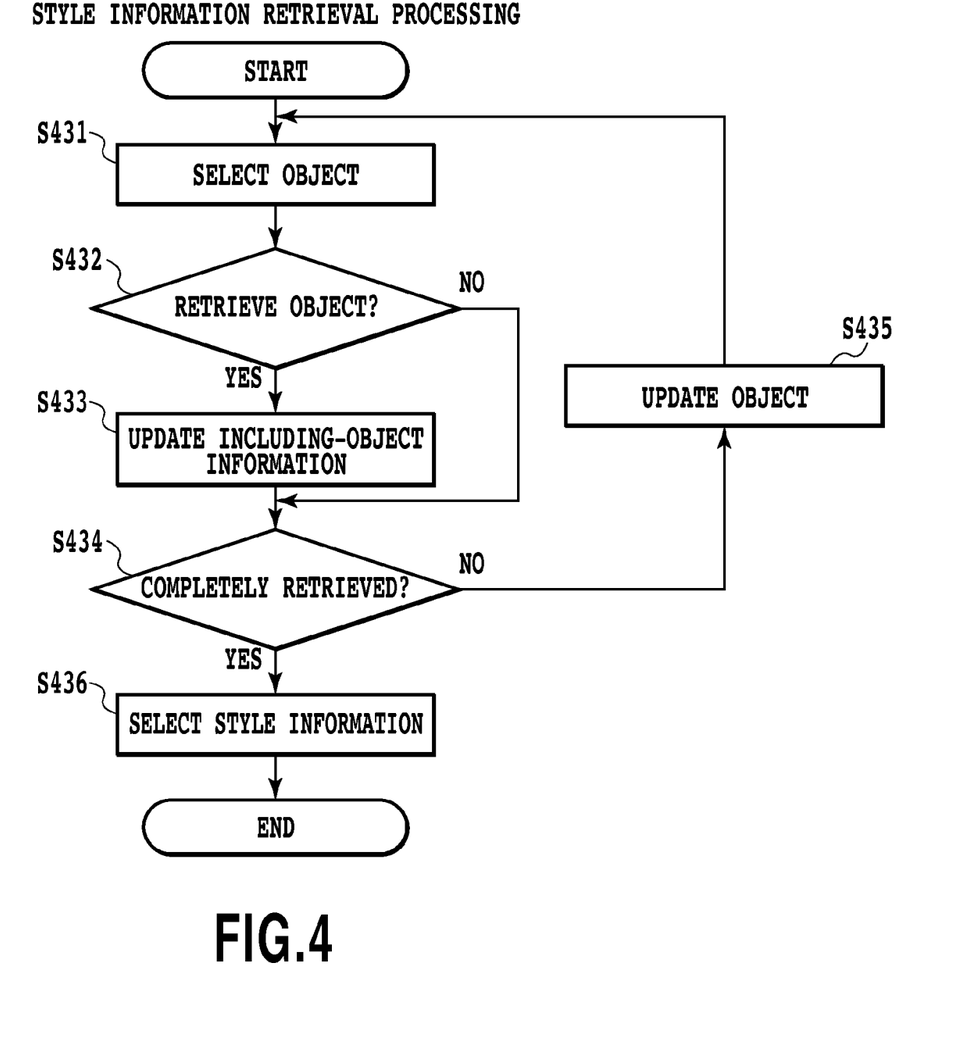
FIG. 4 is a flowchart illustrating style-information retrieval processing according to the embodiment of the present invention.
Figure 5:
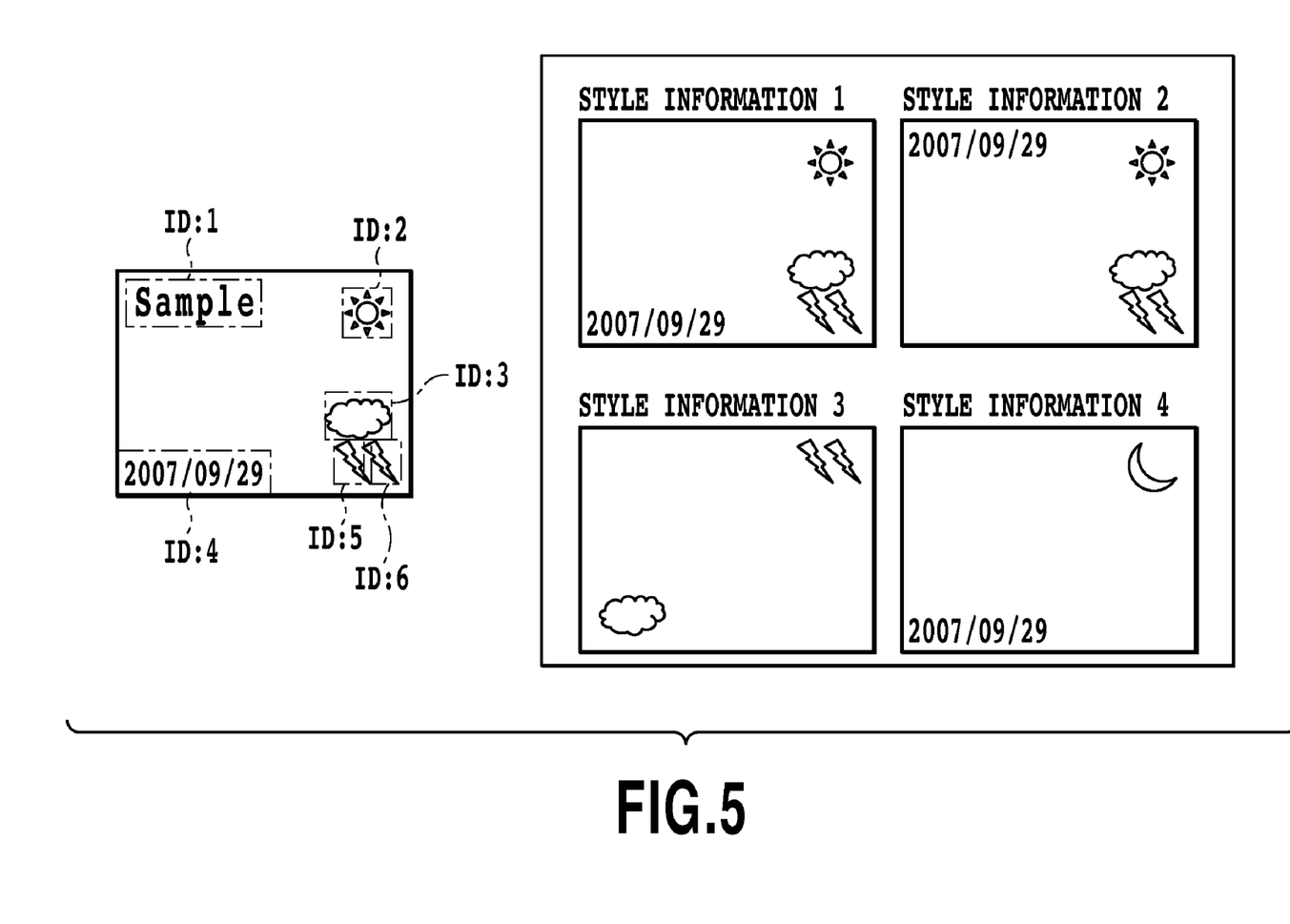
FIG. 5 is a view illustrating the style-information retrieval processing according to the embodiment of the present invention.

First, at Step S431 in FIG. 4, one undetermined object is selected among the extracted plurality of objects as a target object for determination. Next, at Step S432, whether the object can be included among the registered pieces of style information 1 to 4 illustrated at the right side, is retrieved (Object Retrieval). During retrieval, the registered pieces of style information 1 to 4 are retrieved one by one, and, at that time, use of the positional information and the size of the object, enables to reduce a range to be retrieved in the pieces of style information.

Whether an object is included in the style information is determined using various pieces of information of the object. First, by comparing the position and the rectangular sizes of the object with those of the style information, whether the shift between them is within a predetermined error range is determined. Moreover, by comparing the number of colors included in the object and the area of each color, and the representative color of the object with those of the style information, whether the shift between them is within a predetermined error range is determined. Moreover, by obtaining difference in each pixel between the object and the style information, whether the accumulation, the mean value, and the dispersion of the differences are within predetermined ranges is determined. As a result of these pieces of determination, if a predetermined number or more of items are corresponding, the object is determined to be included in the style information (deemed coincidence). Even if the target object for determination and the style information do not coincide with each other perfectly, whether the relationship of deemed coincidence between them is satisfied, is determined according to the above-mentioned criteria.

When, at Step S432, the object is determined to coincide with an object included in anyone of the pieces of style information 1 to 4, at Step S433, included object information that is recorded with being associated with the pieces of style information, is updated.

Figure 6:
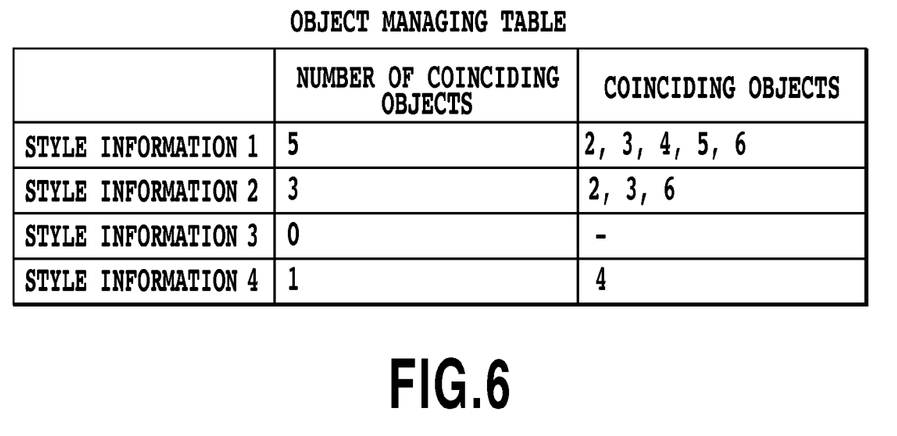
FIG. 6 is a view describing a table for managing the number of coinciding objects to be stored relevant to the style information.

Exemplary included object information is illustrated in FIG. 6. In the illustrated table, the number of objects each coincides with anyone of objects of the pieces of registered style information, and the identification IDs of the coincided objects are registered as the included object information. As the coincided objects number, the total sum of numbers of coincided objects counted from the start of the style-information selection processing is recorded. Moreover, as the coincided objects, the identification numbers (identification IDs) of the coincided objects are recorded.

When the object information is updated, at Step S434 in FIG. 4, whether retrieval is completed with respect to all of the objects is determined. When un-retrieved objects are present, at Step 435, the target object for retrieval is sequentially updated, and back to Step S431, retrieval processing is executed again. Upon finishing retrieval processing with respect to all of the objects, the processor 100, at Step S436, referring to the included object information, selects pieces of style information where all of the object included in the style information coincide with each other and further maximum number of coinciding objects is included in the style information, as a candidate piece of style information. In the example in FIG. 6, style information 1 including maximum number of coinciding objects will be determined as the candidate piece of style information.

Figure 3:
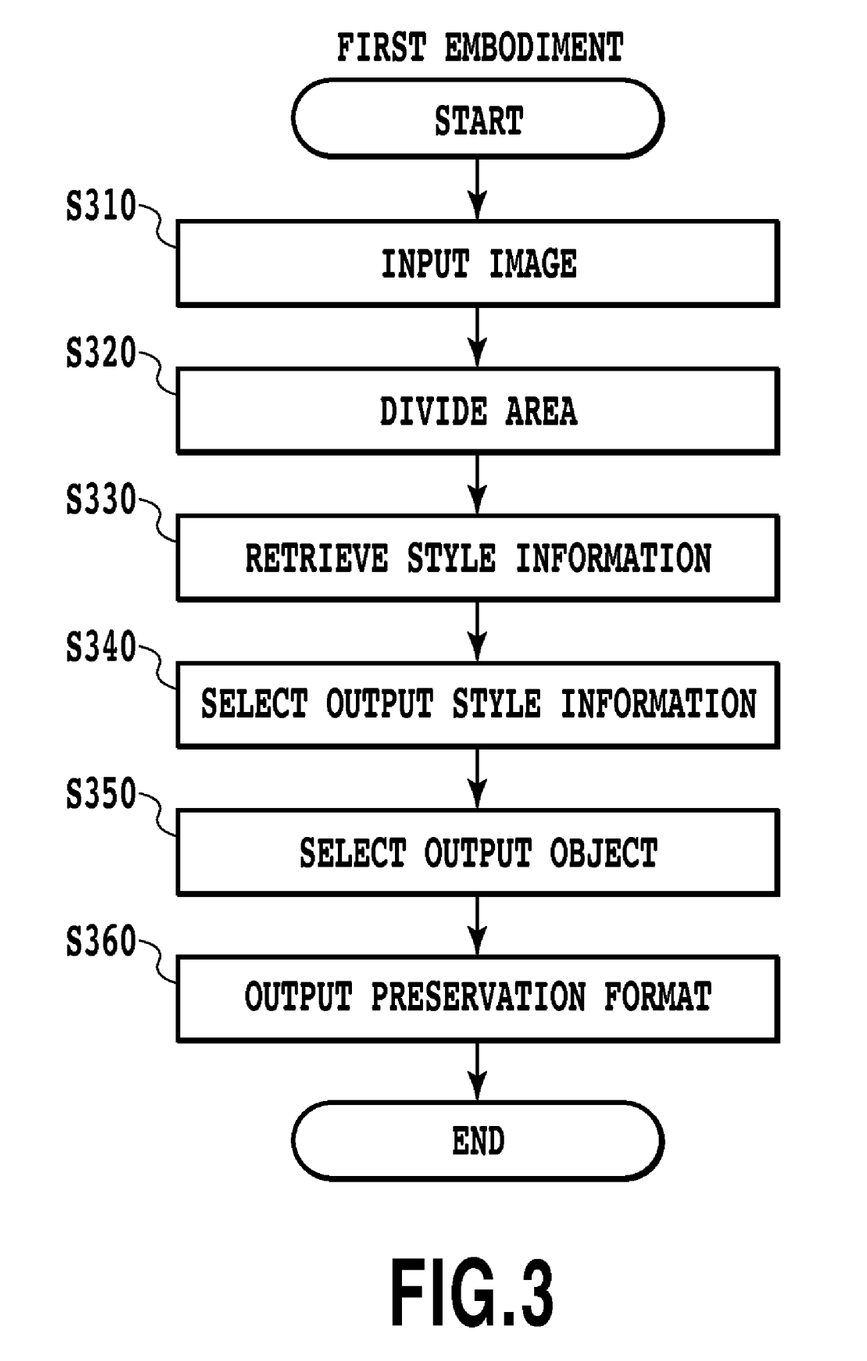
FIG. 3 is a flowchart illustrating main processing of the information processor (image processing device) according to a first embodiment of the present invention.

Now back to FIG. 3, following to the style-information retrieval processing, output style information is selected at Step S340. Although the piece of candidate style information are selected at Step S436, in some cases, a plurality of pieces of style information including maximum number of coinciding objects is present, or in some cases, no piece of style information including coinciding objects is present. If the piece of candidate style information selected at Step S436 is one piece, the piece of style information is selected as the output style information. If two or more pieces of candidate style information are found, a piece of style information including coinciding objects having a larger (largest) occupation area is selected as the output style information. Alternatively, it is possible to present the found two or more pieces of style information to the display device 8 found by using a user selective GUI screen (not illustrated) so that a user may select the output style information among them. If no piece of style information including coinciding objects is found among all pieces of style information, a background image obtained by removing objects from the input image is selected as the output style information.

At Step S350, an object to be output is selected. Since if an object in which the selected output style information includes drawing information is output, data will be output twice, the purpose of the step is to prevent this. Therefore, here, objects that do not coincide with the output-style information (in the example of FIG. 5, objects of ID 1) are selected with reference to a reference table (FIG. 6) that manages the included object information. Moreover, it is possible to cause a user to select an object to be output into the page description part individually, using a user selective GUI screen (not illustrated) as the display device 8 in FIG. 1.

Finally, at Step S360, the object selected at Step S350 and the style information selected at Step S340, are output into an electronic file of a preservation format. For example, the format is a format of presentation software (e.g. a format of Microsoft PowerPoint). The output object is recorded on a page description part, and the style information is recorded on a style description part of the preservation format. Since, usually, the frequency of editing objects in the style information is a few, recording the objects on the style description part prevents them from being edited accidentally in a usual editing operation. Moreover, since added objects that are often edited are included in the page description part, the objects are easily edited. Moreover, since the style information is recorded on the style description part, changing of style will also be easily executed.

Second Embodiment

Figure 7:
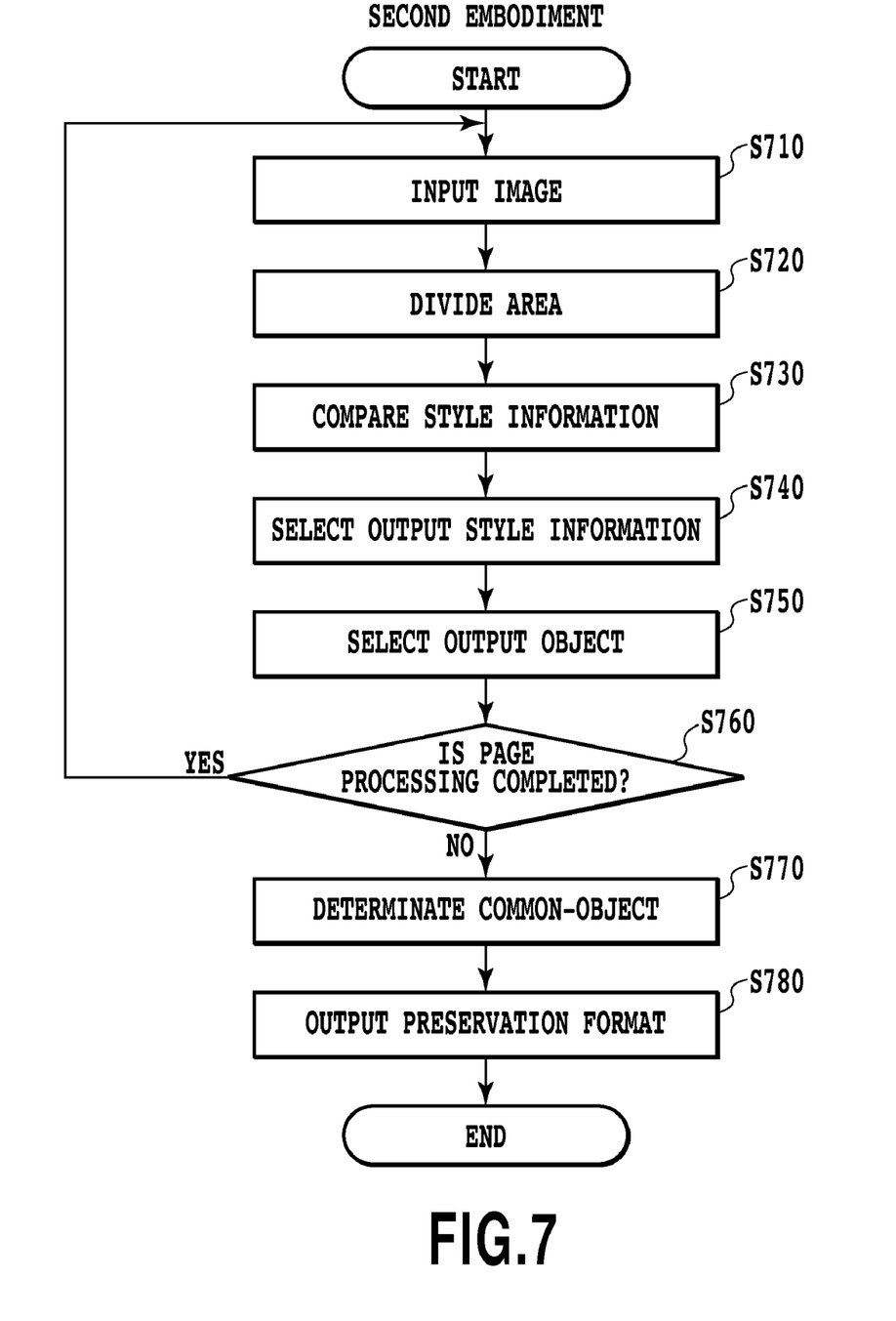
FIG. 7 is a flowchart illustrating main processing of an information processor (image processing device) according to a second embodiment of the present invention.

The flowchart according to a second embodiment of the present invention is illustrated in FIG. 7. According to the present embodiment, when a plurality sheets of and a plurality pages of images are input, objects common to each page are output into a style description part as objects common to all pages.

Steps S710 to S750 correspond to Steps S310 to S350 in the first embodiment. At Step S710, one sheet of page image is read, and at Step S720, it is divided into areas. At Step S730, the objects are compared with registered style information, and at Step S740, output style information is selected. At Step S750, an output object is selected. At Step S760, whether or not all pages of the plurality of input image sheets is subjected to processing is determined, and if un-processed pages are present, procedure will be back to Step S710, and the pages will be subjected to processing per page again.

Figure 8:
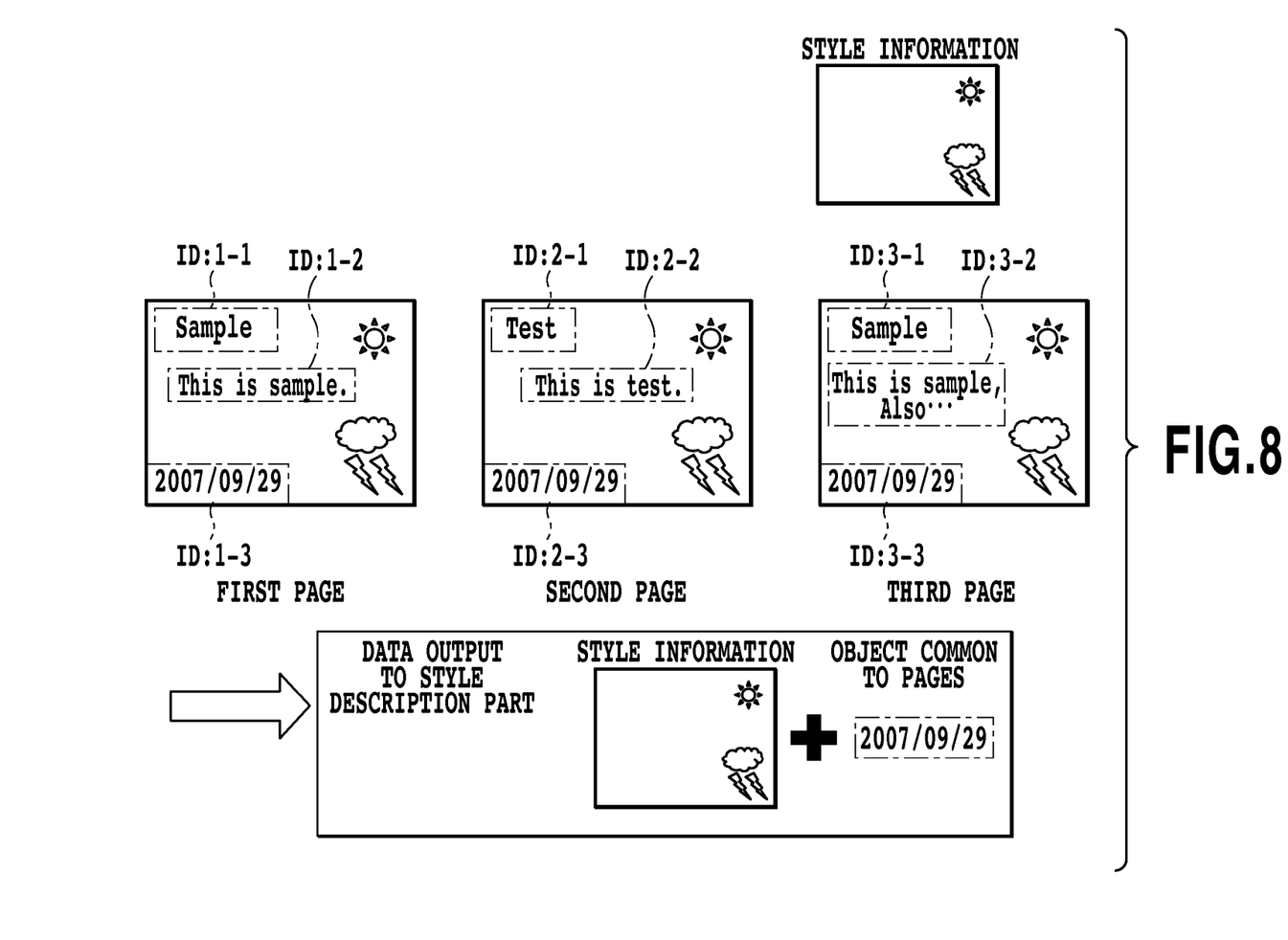
FIG. 8 is a view describing common-object determining processing according to the second embodiment of the present invention.

The upper portion of FIG. 8 illustrates information obtained at the time of Step S760. At this time, selection of output style information and selection of an output object are completed for every image. In first to third manuscripts described in the middle portion of FIG. 8, the style information described in the upper portion of FIG. 8 is selected among registered pieces of style information as coinciding style information. At Step S760, whether an object common to each image except for the objects described in the style information is present, is determined, and if a common object is present, together with the style information, it is output into the style description part common to each page. This is because an editing operation etc. is more easily executed by treating the object commonly included in each image as style information than otherwise. For example, in FIG. 8, objects indicating dates of IDs 1-3, 2-3 and 3-3 are a common object, it is output into the style description part common to each page.

In many cases, objects common to each image are included in the header/footer of the style information. Thus, if, at Step S760, by referring to the header/footer areas included in the style information to execute determination whether a common object is present (common-object determination) only among target objects included therein, it is also possible to execute processing in a higher speed than ever.

Determination whether an object is included in each image can be executed using various pieces of information of the object as the style information retrieval. That is, first, by comparing the position and the rectangular sizes of the object with those of the style information, whether the shift between them is within a predetermined error range is determined. Moreover, by comparing the number of colors included in the object, the area of each color, a representative color of the object with those of the style information, whether the shift between them is within a predetermined error range is determined. Moreover, by obtaining difference in each pixel between the object and the style information, whether the accumulation, the mean value and the dispersion of the differences are within predetermined ranges is determined.

If an object in which a predetermined number or more of items are within predetermined ranges is present, the object can be determined to be common to two comparing images. By executing the same comparison with respect to each image, if an object is determined to be common to a predetermined number or more or a predetermined ratio or more of images, the object can be determined to be common to each image.

If output style information is common to all images, they may be output using the style information selected to one file. If different output style information is selected to some images, it is possible to output an output file using different pieces of style information for one file, or it is also possible to output two or more files by dividing the output file. On the other hand, if coinciding style information is not found in all images, a common object is selected as style information and registered as new style information.

According to the above-mentioned processing according to the present invention, when a plurality of images is inputted, by outputting an object common to each page into a style description part common to all pages, it is possible to cause the object not to be edited easily. Thus, it is possible for an object which is relevant to the style information in many cases and common to each page, to be prevented from being subjected to a miss-operation, for which editing is not necessary essentially, thereby improving editing properties of the output data.

Third Embodiment

Figure 9:
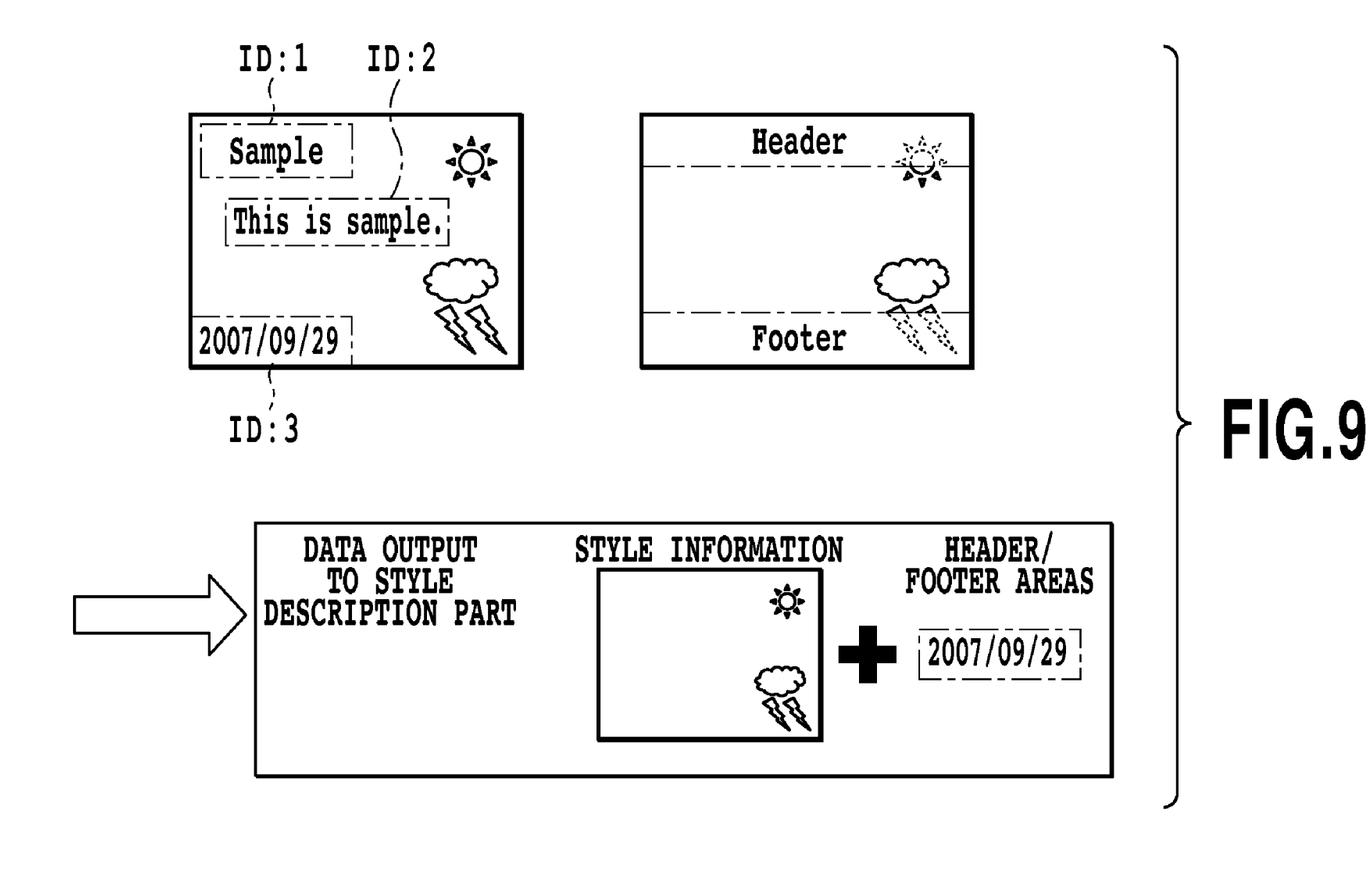
FIG. 9 is a view describing common-object determining processing according to a third embodiment of the present invention.

A third embodiment of the present invention is illustrated in FIG. 9. According to the present embodiment, header/footer information included in style information is referred, and objects included in header/footer areas and the style information are output into a style description part instead of a page description part.

Header and footer are defined in many pieces of style information as areas for recording information common to each page. When a user uses registered style information, it is considered to be very rare for areas of such as characters, graphics, and pictures to be located in the header/footer areas. Thus, according to the present embodiment, if an object included in the areas is found, the object is output into the style description part.

Determination whether an object is included in the header/footer areas can be executed using the positional coordinate and the size information of the object by determining whether they are included in the header/footer areas. That is, by comparing the object with the upper left coordinate and the right lower coordinate of the header/footer, respectively, the inclusion relationship between them can be determined.

By means of the above-mentioned processing according to the present embodiment, by referring to the header/footer information included in the style information, it is possible to cause the object not to be edited easily. Thus, it is possible for an object which is relevant to the style information in many cases and included in the header/footer areas, to be prevented from being subjected to a miss-operation, for which editing is not necessary essentially, thereby improving editing properties of the output data.

Other Embodiments of the Present Invention

A processing method in which a program operating the configurations of the above mentioned embodiments so as to achieve the functions of the above-mentioned embodiment is stored on a medium, the program stored on the medium is read as a code, and the program is executed by a computer, is also included within the scope of the above-mentioned embodiments. Moreover, not only the medium storing the above-mentioned program but also the program itself is included within a scope of the above-mentioned embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-159282, filed Jun. 18, 2008, which is hereby incorporated by reference herein in its entirety.

What is claimed is:

1. An image processing device comprising:
a registration component configured to register a plurality of pieces of style information;
an extraction component configured to extract one or a plurality of objects from image data;
a style-information selection component configured to select style information to be output from said plurality of pieces of style information by comparing the extracted objects with objects included in said plurality of pieces of style information registered on said registration component;
an object selection component configured to select an object which is not included in the selected style information among said extracted objects as an output object; and
an output component configured to output an electronic file in which the selected output object is recorded on a page description part and said selected style information is recorded on a style description part,
wherein the page description part in the electronic file is a description part in which an object capable of being directly edited is recorded in a case where the electronic file is opened by a predetermined application, and wherein the style description part is a description part in which information not capable of being directly edited is recorded and style information is recorded, wherein said style information becomes capable of being edited in a case where an edit for the style information recorded in the style description part is explicitly directed by a user.

2. The image processing device according to claim 1, wherein
said style-information selection component describes inclusion relationship between said plurality of pieces of style information that are registered on said registration component and said extracted objects by said extraction component in a table, and, referring to said table, selects a piece of style information including a maximum number of coinciding objects among said plurality of pieces of style information registered on said registration component.

3. The image processing device according to claim 1, wherein
said style-information selection component, using at least one of positional information of an object, rectangular sizes of an object, number of colors included in the object, a representative color of the object, and difference in pixel between the object and a registered template, determines whether objects coincide with each other.

4. The image processing device according to claim 1, wherein
said style-information selection component, when it is determined that an object that can be deemed to coincide with said extracted object by said extraction component is not included in any one of said plurality of pieces of style information registered on said registration component, selects a background image that is an image after removing said extracted object from said image data as said output-style information.

5. The image processing device according to claim 1, wherein
said output component outputs, when said image data is a plurality of pages of images, further determines whether or not objects common to all images are present among said output objects selected by said object selection component, and outputs an electronic file in which objects determined to be common to all images are recorded on said style description part as an object common to all pages, and objects which are determined not common to all images are recorded on said page description part.

6. The image processing device according to claim 5, wherein
said determination whether or not objects common to all images are present is executed using at least one of positional information of an object, rectangular sizes of the object, number of colors included in the object, a representative color of the object, and difference in pixels between objects.

7. The image processing device according to claim 1, wherein,
when an object that can be deemed to coincide with said extracted objects is included in said plurality of pieces of style information, further referring to header/footer information included in said pieces of style information, and recording objects included in header/footer areas on said style description part.

8. The image processing device according to claim 5, wherein
said determination whether or not objects common to all images are present is executed only with respect to objects included in header/footer areas, and objects common to each image are recorded on said style description part.

9. The image processing device according to claim 1, wherein a format of the electronic file output by said output component is a format of presentation software.

10. The image processing device according to claim 1, wherein a format of the electronic file output by said output component is a format of PowerPoint.

11. An image processing method in an image processing device comprising a registration component configured to register a plurality of pieces of style information, comprising the steps of:
extracting one or a plurality of objects from image data;
selecting style information to be output from said plurality of pieces of style information by comparing said extracted objects with objects included in said plurality of pieces of style information registered on said registration component;
selecting an object which is not included in said selected style information among said extracted objects as an output object; and
outputting an electronic file in which the selected output object is recorded on a page description part, and said selected style information is recorded on a style description part,
wherein the page description part in the electronic file is a description part in which an object capable of being directly edited is recorded in a case where the electronic file is opened by a predetermined application,
and wherein the style description part is a description part in which information not capable of being edited is recorded and style information is recorded, wherein said style information becomes capable of being edited in a case where an edit for the style information recorded in the style description part is explicitly directed by a user.

12. A non-transitory computer readable medium storing computer-executable code of a program, said program code causing a computer to execute the steps of:
registering, on a registration component, a plurality of pieces of style information;
extracting one or a plurality of objects from image data;
selecting style information to be output from said plurality of pieces of style information by comparing said extracted objects with objects included in the plurality of pieces of style information registered on the registration component;
selecting an object which is not included in said selected style information among said extracted objects as an output object; and
outputting an electronic file in which the selected output object is recorded on a page description part, and said selected style information is recorded on a style description part,
wherein the page description part in the electronic file is a description part in which an object capable of being directly edited is recorded in a case where the electronic file is opened by a predetermined application,
and wherein the style description part is a description part in which information not capable of being directly edited is recorded and style information is recorded, wherein said style information becomes capable of being edited in a case where an edit for the style information recorded in the style description part is explicitly directed by a user.

* * * * *